(12) United States Patent
Kim et al.

(10) Patent No.: US 8,274,475 B2
(45) Date of Patent: Sep. 25, 2012

(54) COORDINATE INFORMATION PROVIDING METHOD AND VIDEO APPARATUS THEREOF

(75) Inventors: Dong-young Kim, Seongnam-si (KR); Ho-jeong You, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1046 days.

(21) Appl. No.: 11/856,782

(22) Filed: Sep. 18, 2007

(65) Prior Publication Data

US 2008/0266248 A1 Oct. 30, 2008

Related U.S. Application Data

(60) Provisional application No. 60/913,651, filed on Apr. 24, 2007.

(30) Foreign Application Priority Data

Jul. 4, 2007 (KR) .......................... 10-2007-0067162

(51) Int. Cl.
 G09G 5/00 (2006.01)
 G09G 5/08 (2006.01)
 G06F 3/033 (2006.01)
(52) U.S. Cl. ......................................... 345/157; 345/156
(58) Field of Classification Search .......... 345/156–184; 178/18.01–20.04
 See application file for complete search history.

(56) References Cited

U.S. PATENT DOCUMENTS

| | | | | |
|---|---|---|---|---|
| 7,612,685 B2 * | 11/2009 | Harris et al. | ............... | 340/825.2 |
| 7,696,980 B1 * | 4/2010 | Piot et al. | ...................... | 345/157 |
| 2005/0116930 A1 * | 6/2005 | Gates | ........................... | 345/158 |
| 2006/0095596 A1 * | 5/2006 | Yung et al. | ........................ | 710/5 |
| 2006/0235698 A1 * | 10/2006 | Cane et al. | .................... | 704/275 |
| 2006/0235701 A1 * | 10/2006 | Cane et al. | .................... | 704/275 |
| 2009/0147137 A1 * | 6/2009 | Bae et al. | ...................... | 348/554 |

OTHER PUBLICATIONS

TiVo HD Series 3—Digital Media Recorder Higih Definition Viewer's Guide; Copyright 2006.*
SleekGeek.com, TiVo Series 3 Release Date; Mar. 15, 2006.*
High-Defintion Multimedia Interface Specificion, Informational Version 1.0; Sep. 4, 2003; www.hdmi.org.*
High-Defintion Multimedia Interface, Specificion Version 1.1; May 20, 2004; www.hdmi.org.*
High-Defintion Multimedia Interface, Specificion Version 1.2; Aug. 22, 2005; www.hdmi.org.*
High-Defintion Multimedia Interface, Specificion Version 1.2a; Dec. 14, 2005; www.hdmi.org.*
High-Defintion Multimedia Interface, Specificion Version 1.3; Jun. 22, 2006; www.hdmi.org.*
Tivo Debuts Revolutuionary Series3 High Defitinton Digital Media Recorder, Sep. 12, 2006, TiVo, http://www.tivo.com/cms_static/press_111.html.*

* cited by examiner

*Primary Examiner* — Alexander Eisen
*Assistant Examiner* — Patrick F Marinelli
(74) *Attorney, Agent, or Firm* — Sughrue Mion, PLLC (57) ABSTRACT

A method for providing coordinate information to an external device and a video apparatus thereof. The coordinate information providing method includes receiving coordinate information input by a user from an input device; and transmitting a coordinate information delivery message containing the coordinate information input through the input device, to an external device connected according to a High Definition Multimedia Interface (HDMI) Consumer Electronics Control (CEC) specification. Accordingly, the video apparatus can control the external device by transferring the coordinate information to the external device.

19 Claims, 8 Drawing Sheets

COORDINATE INFORMATION PROVIDING METHOD AND VIDEO APPARATUS THEREOF

CROSS-REFERENCE TO RELATED APPLICATIONS

This application claims priority from Korean Patent Application No. 10-2007-0067162, filed Jul. 4, 2007, with the Korean Intellectual Property Office, and U.S. provisional Application No. 60/913,651, filed Apr. 24, 2007, with the US PTO, the entire disclosure of which is hereby incorporated by reference.

BACKGROUND OF THE INVENTION

1. Field of the Invention

Apparatuses and methods consistent with the present invention relate to a coordinate information providing method and a video apparatus thereof, and more particularly, to a method for providing coordinate information to an external device connected to a video apparatus, and the video apparatus thereof.

2. Description of the Related Art

Figure 1:
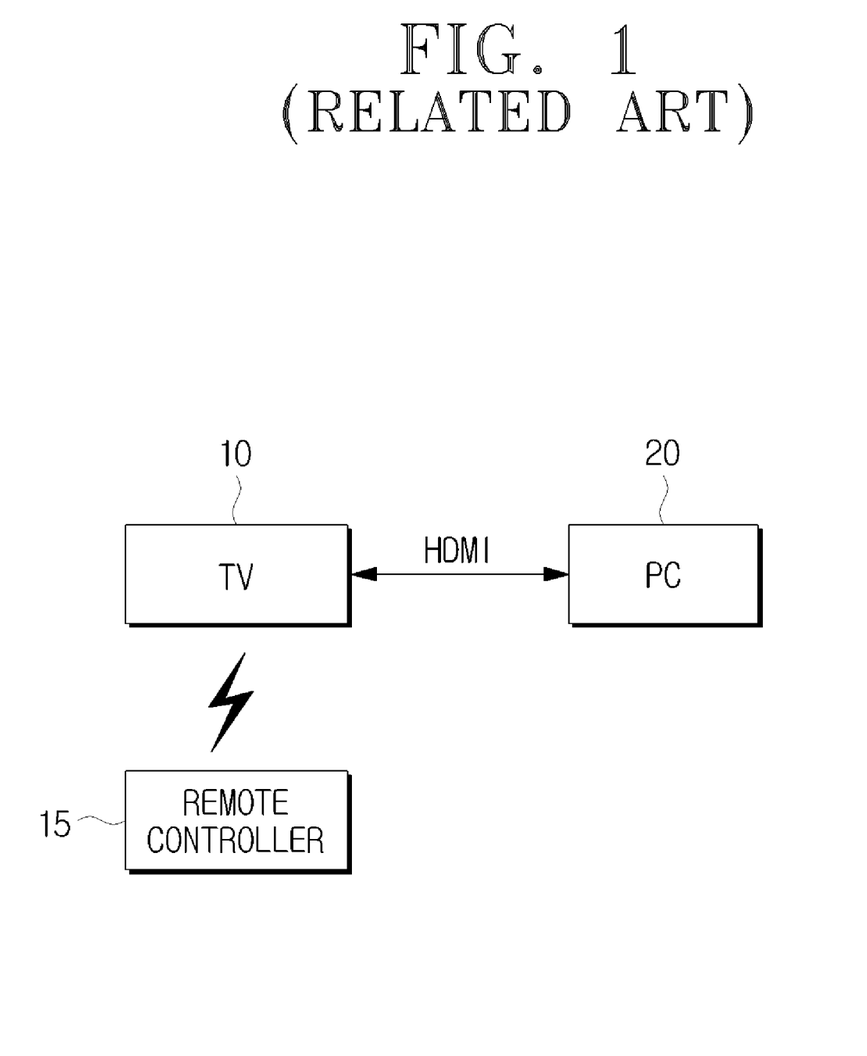
FIG. 1 is a diagram of a video system connected according to a HDMI CEC specification.

FIG. 1 depicts a video system connected according to a High Definition Multimedia Interface (HDMI) Consumer Electronics Control (CEC) specification. The video system of FIG. 1 is constructed by connecting a television (TV) 10 to a personal computer (PC) 20 according to the HDMI CEC specification. Not only video signals but also control signals are transceived between the TV 10 and the PC 20 according to the HDMI CEC specification.

The TV 10 can forward a user command input through a remote controller 15 to the PC 20. That is, the user can control the operation of the PC 20 merely using the remote controller 15 of the TV 10.

However, to control the PC 20 by means of the remote controller 15 of the TV 10, the user needs to manipulate direction keys of UP, DOWN, LEFT, and RIGHT. Also, even if the remote controller 15 can point coordinates on a screen, a message for conveying the coordinate information is not defined in the HDMI CEC specification.

As a result, the user needs to manipulate the direction keys of the remote controller 15 to control the external device using the remote controller 15 of the TV 10. Besides, even if the remote controller 15 has the pointing function, the user cannot use this pointing function but has to utilize the direction keys.

Actually, as the external device and its services are becoming diverse, it is necessary to provide the pointing function using the remote controller 15 for the user's convenience. Therefore, a method for allowing the user to more easily control the external device using the remote controller of the TV is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a method for providing coordinate information to an external device being connected, and a video apparatus thereof.

Another aspect of the present invention provides a method for acquiring coordinate information from a connected external device, and a video apparatus thereof.

According to an aspect of the present invention, there is provided a coordinate information providing method comprising receiving coordinate information input by a user from an input device; and transmitting a coordinate information delivery message containing the coordinate information input through the input device, to an external device connected according to a HDMI CEC specification.

The coordinate information delivery message may comprise a command code indicative of a transferred command of the coordinate information, horizontal coordinate information, and vertical coordinate information.

The coordinate information providing method may further comprise receiving a coordinate information available message which specifies whether the external device is able to use the coordinate information, from the external device.

The coordinate information available message may comprise a coordinate information available command code and information relating to whether the coordinate information is available.

The coordinate information providing method may further comprise when an event is generated at the input device by the user, transmitting an event message informing of the event generation at the input device, to the external device.

The event may comprise a button press event, a button release event, a wheel scroll-up event, and a wheel scroll-down event.

The button press event message may comprise a button press command code and button type information.

The button release event message may comprise a button release command code and button type information.

According to the aspect of the present invention, there is provided a video apparatus comprising a controller for generating a coordinate information delivery message to transfer coordinate information input through an input device, to an external device connected according to a HDMI CEC specification; and an interface for transmitting the coordinate information delivery message to the external device.

The coordinate information delivery message may comprise a command code indicative of a transferred command of the coordinate information, horizontal coordinate information, and vertical coordinate information.

The interface may receive a coordinate information available message which specifies whether the coordinate information is available, from the external device.

The coordinate information available message may comprise a coordinate information available command code and information relating to whether the coordinate information is available.

When an event is generated at the input device by the user, the controller may generate an event message informing of the event generation at the input device, and the interface may transmit the event message to the external device.

The event may comprise a button press event, a button release event, a wheel scroll-up event, and a wheel scroll-down event.

The button press event message may comprise a button press command code and button type information.

The button release event message may comprise a button release command code and button type information.

According to another aspect of the present invention, there is provided a coordinate information providing method comprising receiving a coordinate information delivery message containing coordinate information input at an input device, from an external device connected according to a HDMI CEC specification; and moving a pointer to coordinates corresponding to the coordinate information contained in the received coordinate information delivery message.

The coordinate information delivery message may comprise a command code indicative of a transferred command of the coordinate information, horizontal coordinate information, and vertical coordinate information.

According to another aspect of the present invention, there is provided a video apparatus comprising an interface which receives a coordinate information delivery message containing coordinate information input at an input device, from an external device connected according to a HDMI CEC specification; and a controller which controls to move a pointer to coordinates corresponding to the coordinate information contained in the received coordinate information delivery message.

The coordinate information delivery message may comprise a command code indicative of a transferred command of the coordinate information, horizontal coordinate information, and vertical coordinate information.

According to another aspect of the present invention, there is provided a coordinate information providing method comprising when an event is generated at an input device by a user, generating an event message informing of the event generation at the input device; and transmitting the event message to an external device connected according to a HDMI CEC specification.

According to another aspect of the present invention, there is provided a video apparatus comprising a controller which, when an event is generated at an input device by a user, generates an event message informing of the event generation at the input device; and an interface which transmits the event message to an external device connected according to a HDMI CEC specification.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Exemplary embodiments of the present invention will now be described in greater detail with reference to the accompanying drawings.

Figure 2:
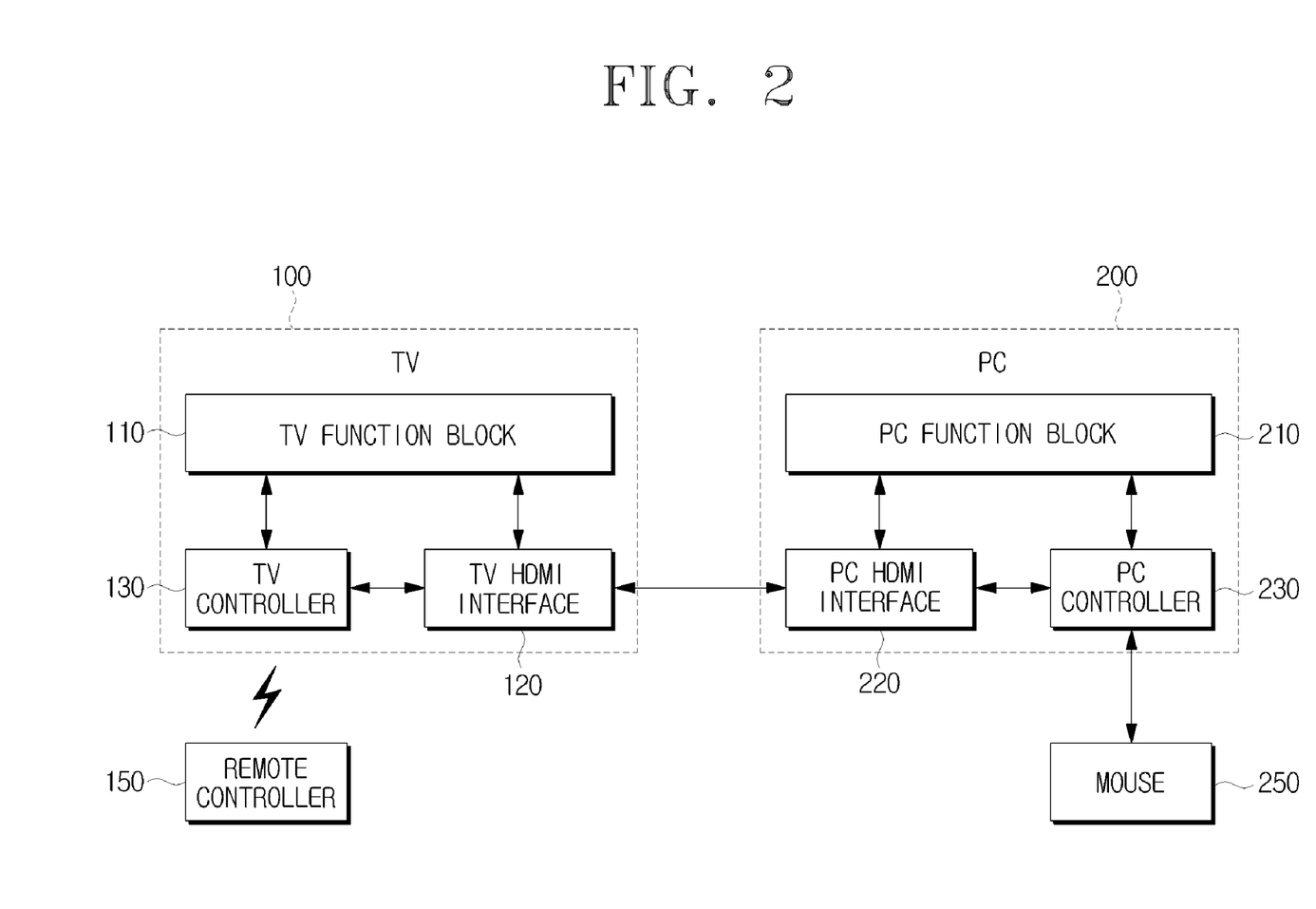
FIG. 2 is a block diagram of a video system according to an exemplary embodiment of the present invention.

FIG. 2 is a block diagram of a video system which the present invention is applicable to. The video system of FIG. 2 is constructed by connecting a television (TV) 100 to a personal computer (PC) 200 according to a High Definition Multimedia Interface (HDMI) Consumer Electronics Control (CEC) specification.

In FIG. 2, the TV 100 comprises a TV function block 110, a TV HDMI interface 120, and a TV controller 130. The TV 100 receives a user command through a remote controller 150.

The TV function block 110 performs the TV function. In more detail, the TV function block 110 decodes and scales a broadcast signal received from a broadcast station by radio or by cable and displays the processed signal on a display to provide the broadcast screen to a user. The TV function block 110 can display a video corresponding to the video signal provided from the PC 200 through the TV HDMI interface 120 on the display, which is to be explained.

The TV HDMI interface 120 is connected to the PC 200 according to the HDMI CEC specification to transmit and receive a video signal and a message of the mutual control function between the TV 100 and the PC 200.

The TV HDMI interface 120 forwards a coordinate information delivery message comprising coordinate information input through the remote controller 150 from the TV 100 to the PC 200. The TV HDMI interface 120 sends an event message informing of the event generation at the remote controller 150 to the PC 200. The TV HDMI interface 120 receives a coordinate information message relating to whether the coordinate information from the PC 200 is available.

The TV controller 130 controls the operation of the TV function block 110 according to a user command input through the remote controller 150. Also, the TV controller 130 can control the operation of the PC 200 by transmitting a control command to the PC 200 through the TV HDMI interface 120.

The TV controller 130 generates a coordinate information delivery message to carry the coordinate information input through the remote controller 150 to the connected PC 200. The coordinate information delivery message comprises a command code indicative of the delivered command, horizontal coordinate information, and vertical coordinate information. After receiving a coordinate information available message relating to whether the PC 200 can use the coordinate information from the PC 200, the TV controller 130 may generate the coordinate information delivery message.

When an event is generated at the remote controller 150, the TV controller 130 generates an event message informing of the event generation. Herein, the event can be a button press event, a button release event, a wheel scroll-up event, a wheel scroll-down event, and a drag event.

For instance, when the user presses a button of the remote controller 150, the TV controller 130 generates a button press event message. When the user releases the button in the remote controller 150, the TV controller 130 generates a button release event message. The button press event message and the button release event message can comprise a command code and button type information.

The remote controller 150 receives a command to control the TV 100 from the user and transmits the received command to the TV 100. The remote controller 150 may receive a command for controlling an external device connected using the HDMI CEC.

The remote controller 150 has a pointing function for selecting a specific point on the screen of the TV 100. For instance, the remote controller comprises a touch pad. When the user touches a spot in the touch pad, a pointer moves to the corresponding spot. Hence, the remote controller 150 can function as a mouse 250 of the PC 200.

The PC 200 in FIG. 2 comprises a PC function block 210, a PC HDMI interface 220, a PC controller 230, and the mouse 250.

The PC function block 210 performs the proper functions of the PC 200. In more detail, the PC function block 210 can record a broadcast signal input from the TV 100 through the PC HDMI interface 220 to its storage device, or read a video signal recorded in the storage device and provide the read video signal to the TV 100 through the PC HDMI interface 220, which is to be explained.

The PC function block 210 moves the pointer to the coordinates as contained in the coordinate information delivery message fed from the TV 100. The PC function block 210 generates a video signal relating to the moved pointer and sends the generated video signal to the TV 100.

When receiving the event message from the TV 100, the PC function block 210 performs a function corresponding to the event. For instance, when receiving the button press event message, the PC function block 210 can perform a function for selecting an icon indicated by the pointer. When receiving the button release event message, the PC function block 210 can execute a function for releasing the icon selection indicated by the pointer.

The PC HDMI interface 220 is connected to the TV 100 according to the HDMI CEC specification to enable to transmit and receive video signals and messages between the TV 100 and the PC 200.

The PC controller 230 controls the operation of the PC function block 210 according to a control command of the TV controller 130 which is input through the PC HDMI interface 220.

The PC controller 230 generates a coordinate information available message relating to whether the coordinate information is available. The coordinate information available message comprises a coordinate information available command code and information relating to whether the coordinate information is available. In general, the PC 200 comprises the mouse 250 and thus utilizes the coordinate information. Accordingly, the PC 200 generates the coordinate information available message comprising the information which indicates the coordinate information availability. For instance, the PC controller 230 can generate a coordinate information available message <User Mouse>[Enable]. <User Mouse> is a command code and [Enable] is a parameter value.

The PC controller 230 controls the PC function block 210 according to the coordinate information delivery message and the event message received from the TV 100.

Figure 3:
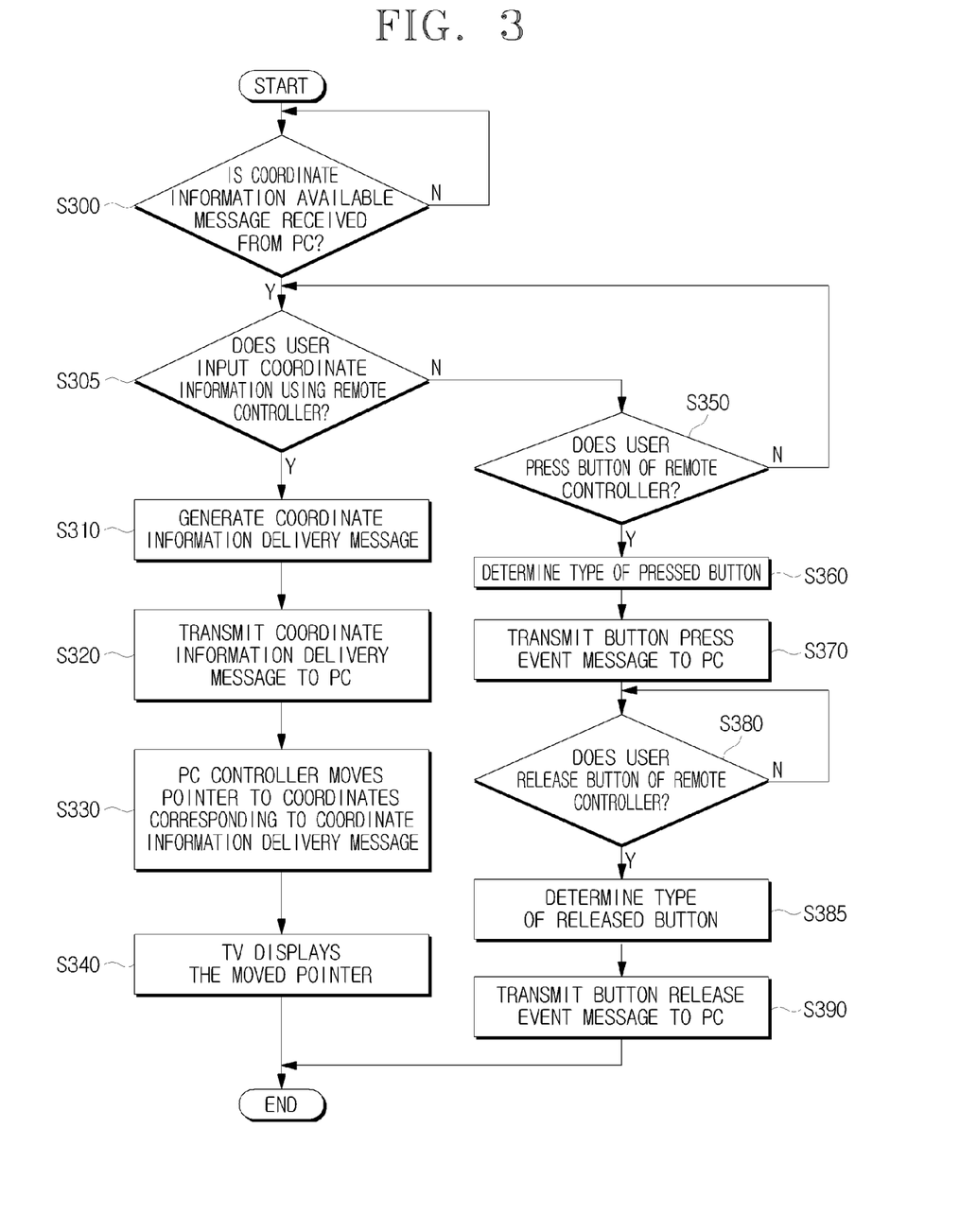
FIG. 3 is a flowchart of a coordinate information providing method based on a TV according to an exemplary embodiment of the present invention.

Now, the coordinate information provided by TV 100 to the external device is described in detail by referring to FIG. 3. FIG. 3 is a flowchart of a coordinate information providing method based on the TV 100 according to exemplary embodiment of the present invention.

In FIG. 3, the TV 100 determines whether the coordinate information available message is received from the PC 200 (S300). When the coordinate information available message is received (S300-Y), the TV 100 determines whether the user inputs coordinate information using the remote controller 150 (S305). For instance, when the user touches the touch pad (not shown) of the remote controller 150, coordinate information corresponding to the touched position in the touch pad is input.

When the user inputs the coordinate information to the remote controller 150 (S305-Y), the TV controller 130 generates a coordinate information delivery message (S310). The coordinate information delivery message comprises a coordinate information delivery command code, horizontal coordinate information, and vertical coordinate information. For example, it is assumed that the coordinate information delivery message is <Move Mouse Position>([horizontal position], [vertical position]). <Move Mouse Position> is the coordinate information delivery command code, and [horizontal position], [vertical position] is a parameter value corresponding to the horizontal coordinate information and the vertical coordinate information. If the user inputs the coordinate information of (100, 200) through the remote controller 150, the coordinate information delivery message <Move Mouse Position>(100, 200) is generated.

The horizontal coordinate information and the vertical coordinate information can be constituted to indicate a position change value with respect to the current pointer position. For example, when the current pointer position is (100, 200) and the coordinate information delivery message is <Move Mouse Position>(10, 20), the pointer moves to (110, 220). In this case, the coordinate information delivery message can be defined to <Move Mouse Position>([horizontal movement], [vertical movement]).

Next, the TV controller 130 transmits the generated coordinate information delivery message to the PC 200 through the TV HDMI interface 120 (S320). The PC controller 230 moves the pointer to the coordinates corresponding to the received coordinate information delivery message (S330). The PC controller 230 generates a video signal of the moved pointer and transmits the generated video signal to the TV 100.

The TV controller 130 receives the video signal of the moved pointer and controls the TV function block 110 to display the video signal (S340). If the user inputs the coordinate information (100, 200) through the remote controller 150, the TV 100 receives from the PC 200 and displays a video signal of the pointer (e.g., an arrow shape) positioned in the coordinates (100, 200).

By contrast, when the user does not input the coordinate information (S305-N), the TV controller 130 determines whether the user presses a button of the remote controller 150 (S350). When the user presses the button of the remote controller 150 (S350-Y), the TV controller 130 determines a type of the pressed button (S360). For instance, the TV controller 130 determines which one of a left function button and a right function button is pressed. The left function button of the remote controller 150 corresponds to the left function button of the mouse 250 connected to the PC 200, and the right function button of the remote controller 150 corresponds a right function button of the mouse 250 connected to the PC 200.

The controller 130 generates and transmits a button press event message to the PC 200 (S370). The button press event message comprises a button press command code and button type information. By way of example, it is assumed that the button press event message is <Mouse Button Pressed>([Button Type]), where <Mouse Button Pressed> is the button press command code and [Button Type] is a parameter value corresponding to the button type information. If the user pressed the left function button of the remote controller 150, the button press event message can be <Mouse Button Pressed>(Left Button).

Next, the controller 130 determines whether the user releases the button of the remote controller 150 (S380). When the user released the button (S380-Y), the TV controller 130 determines the type of the released button (S385).

Next, the TV controller 130 generates and transmits a button release event message to the PC 200 (S390). The button release event message comprises a button release command code and button type information. For example, it is assumed that the button release event message is <Mouse Button Released>([Button Type]), where <Mouse Button Released> is the button release command code and [Button Type] is a parameter value corresponding to the button type information. If the user released the left function button of the remote controller 150, the button release event message can be <Mouse Button Released>(Left Button).

So far, the method for the TV 100 to provide the coordinate information to the external device has been described by referring to FIG. 3.

Figure 4:
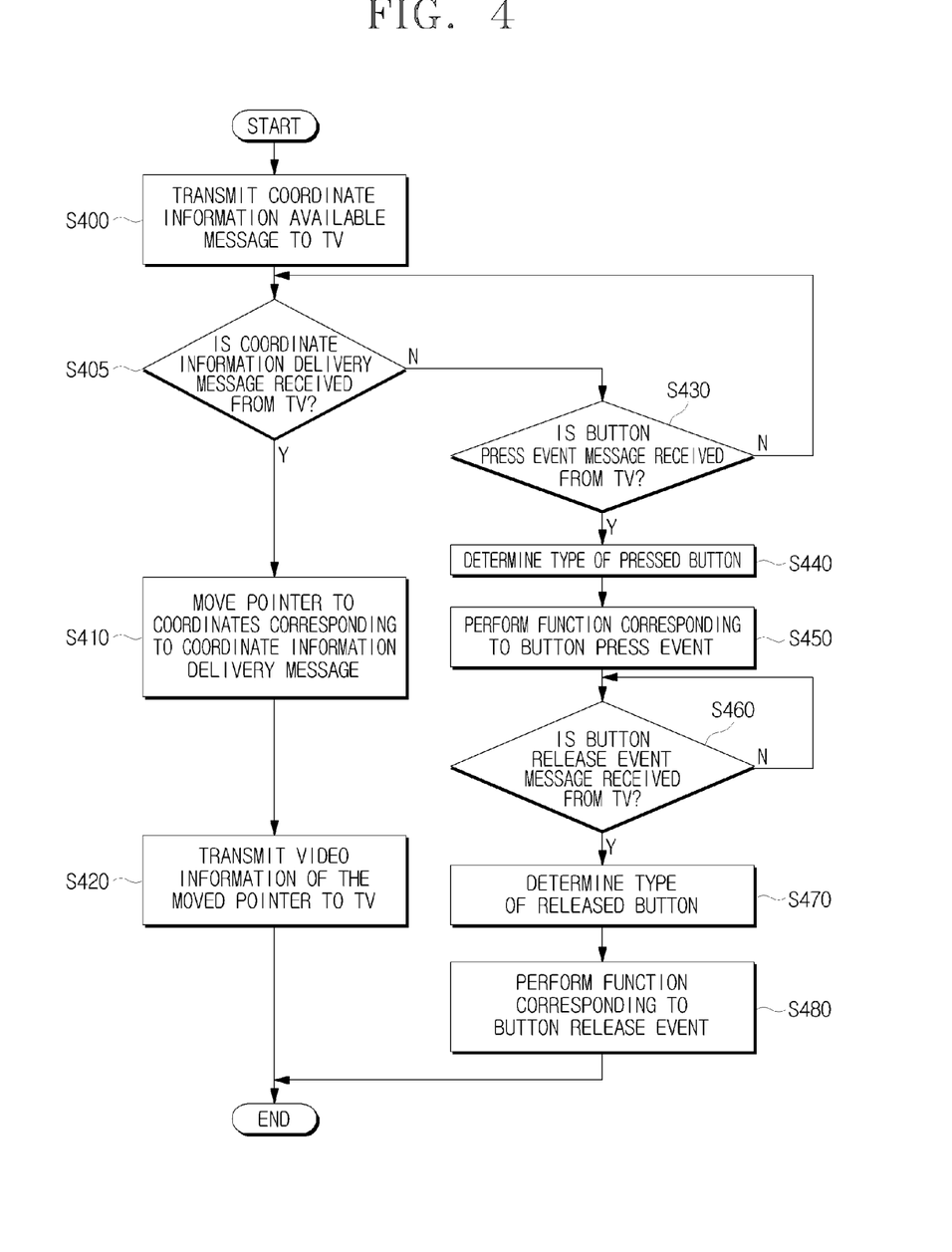
FIG. 4 is a flowchart of a coordinate information providing method based on a PC according to an exemplary embodiment of the present invention.

Now, how the PC 200 acquires the coordinate information from the external device is illustrated by referring to FIG. 4. FIG. 4 is a flowchart of a coordinate information providing method based on the PC 200 according to an exemplary embodiment of the present invention.

The PC controller 230 generates and transmits a coordinate information available message to the TV 200 (S400). The coordinate information available message comprises a coordinate information available command code and button type information. For instance, the PC controller 230 can generate the coordinate information available message <Use Mouse> [Enable], where <Use Mouse> is a command code and [Enable] is a parameter value.

Next, the PC controller 230 determines whether a coordinate information delivery message is received from the TV 100 (S405). When receiving the coordinate information delivery message (S405-Y), the PC controller 230 moves the pointer to the coordinates corresponding to the coordinate information delivery message (S410). The PC controller 230 generates and transmits video information of the moved pointer to the PC 100 (S420).

When the coordinate information delivery message is not received (S405-N), the PC controller 230 determines whether a button press event message is received from the TV 100 (S430).

When receiving the button press event message (S430-Y), the PC controller 230 determines a type of the pressed button (S440). The type of the pressed button can be determined by referring to a parameter value of the received button press event message. Next, the PC controller 230 controls the PC function block 210 to perform a function corresponding to the button press event (S450). For instance, when the user presses the left function button of the remote controller 150, the PC controller 230 can control the PC function block 210 to function as if the left button of the mouse 250 of the PC 200 is clicked.

The PC controller 230 determines whether a button release event message is received from the TV 100 (S460). Upon receiving the button release event message (S460-Y), the PC controller 230 determines a type of the released button (S470). The type of the released button can be determined by referring to a parameter value of the button release event message.

Next, the PC controller 230 controls the PC function block 210 to perform a function corresponding to the button release event (S480). For instance, if the user releases the left function button of the remote controller 150, the PC controller 230 can control the PC function block 210 to function as if the left button of the mouse 250 of the PC 200 is unclicked.

So far, the coordinate information providing procedure between the video apparatus and the connected external device has been described by referring to FIGS. 3 and 4.

Hereafter, the structure of messages exchanged between the video apparatus and the connected external device is explained in detail by referring to FIGS. 5 through 9.

Figures 5, 6:
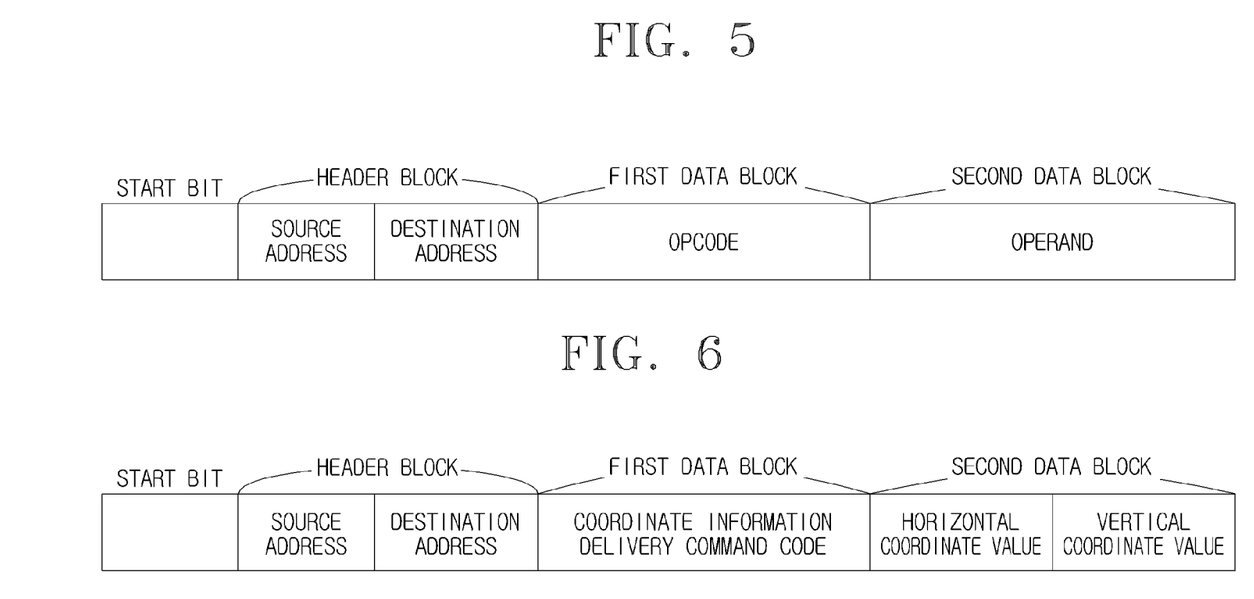
FIG. 5 is a diagram of a message structure according to the HDMI CEC specification according to an exemplary embodiment of the present invention.
FIG. 6 is a diagram of a coordinate information delivery message according to an exemplary embodiment of the present invention.

FIG. 5 is a diagram of a message structure according to the HDMI CEC specification according to an exemplary embodiment of the present invention. As shown in FIG. 5, the message according to the HDMI CEC specification comprises a start bit, a header block, a first data block, and a second data block.

The start bit indicates the start of the message. In general, the start bit of 1 bit is most preferable in terms of the efficiency. However, the start bit is not limited to 1 bit but may consist of bits.

The header block comprises a source address and a destination address. The source address is an address of the message transmitting device, and the destination address is an address of the message receiving device. Typically, the source address and the destination address are in the logical address form.

Besides, the header block further comprises an End Of Message (EOM) bit (not shown) and an Acknowledge (ACK) bit (not shown). The EOM bit signifies the end of the message. For example, when the EOM bit '0' signifies no end of the message and '1' signifies the end of the message. When the message comprises the EOM bit, the end of the message can be learned. Hence, the message can be of a variable length.

The ACK bit signifies whether the message is successfully received at the destination. For example, when the message is initially generated, the ACK bit is set to '1'. When the message is transferred to the device of the wrong destination address, the device responds with the ACK bit '1'. When the message is received at the destination device, the device responds with the altered ACK bit '0'. The source device checks whether the message is successfully transmitted by examining whether the ACK bit of the response message is '0' or '1'.

In general, the source address and the destination address of the HDMI CEC each comprise 4 bits, and the EOM bit and the ACK bit each comprise 1 bit. Accordingly, the header block comprises 10 bits in total.

The first data block comprises OPCODE which is a code value of a command corresponding to the message role. That is, the OPCODE carries the code value of the command code.

For example, the command <Active Source> for delivering the active source address has the OPCODE value of 0x82.

The OPCODE is the 8-bit code value. The first data block also comprises an EOM bit and an ACK bit. Hence, the first data block comprises 10 bits in total.

The second data block comprises OPERAND which is a parameter value of the command corresponding to the OPCODE. Accordingly, the OPERAND value is determined by the OPCODE. For example, the command <Active Source> accompanies the parameter value [Physical Address]. Accordingly, the OPERAND contains [Physical Address] information.

The OPERAND comprises a plurality of data blocks. Each block comprises 8-bit data, EOM bit, and ACK bit and thus comprises 10 bits in total. The HDMI CEC specification describes that the OPERAND can comprise 14 data blocks in maximum. In other words, the second data can comprise 14 data blocks in maximum and its maximum size is 140 bits (=14*10).

As above, the message comprises the header block, the first data block, and the second data block and its total size is up to 160 bits (=16*10).

FIG. 6 shows the structure of the coordinate information delivery message according to an exemplary embodiment of the present invention. The coordinate information delivery message of FIG. 6 comprises a start bit, a header block, a first data block, and a second data block.

The header block comprises a source address and a destination address. According to the exemplary embodiment of the present invention, since the TV 100 sends the coordinate information delivery message to the PC 200, the source address is the logical address value of the TV 100 and the destination address is the logical address value of the PC 200.

The first data block carries the coordinate information delivery command code which is recorded as <OPCODE>. For example, the coordinate information delivery command code can be defined as <Move Mouse Position>.

The second data block comprises horizontal coordinate information and vertical coordinate information. <Move Mouse Position> has a parameter [horizontal position], [vertical position]. For example, when the coordinate information delivery message is <Move Mouse Position>(100, 200), the pointer is moved to (100, 200).

The parameter may be a horizontal coordinate change value and a vertical coordinate change value. In this case, <Move Mouse Position> can have the parameter [horizontal movement], [vertical movement]. If the current pointer position is (100, 200) and the coordinate information delivery message is <Move Mouse Position>(10, 20), the pointer is moved to (110, 220).

Figure 7:
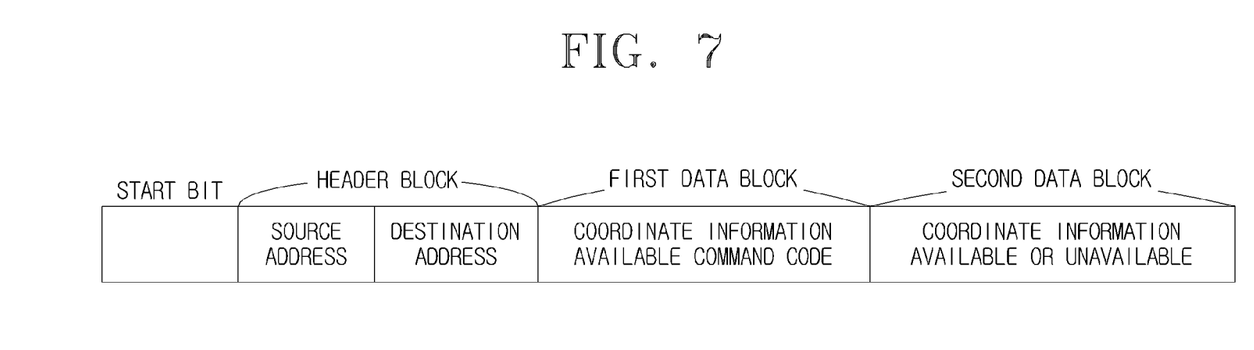
FIG. 7 is a diagram of a coordinate information available message according to an exemplary embodiment of the present invention.

FIG. 7 shows the structure of the coordinate information available message according to an exemplary embodiment of the present invention. The coordinate information available message of FIG. 7 comprises a start bit, a header block, a first data block, and a second data block.

The header block comprises a source address and a destination address. Since the PC 200 sends the coordinate information available message to the TV 100, the source address is the logical address value of the PC 200 and the destination address is the logical address value of the TV 100.

The first data block comprises a coordinate information available command code of <OPCODE>. For example, the coordinate information available command code at the PC 200 can be defined as <Use Mouse>.

The second data block comprises information relating to whether the coordinate information is available. <Use Mouse> can have a parameter [Enable] or [Disable]. For example, the coordinate information available message <Use Mouse>(Enable) signifies that the PC 200 can utilize the mouse and the coordinate information.

Figure 8:
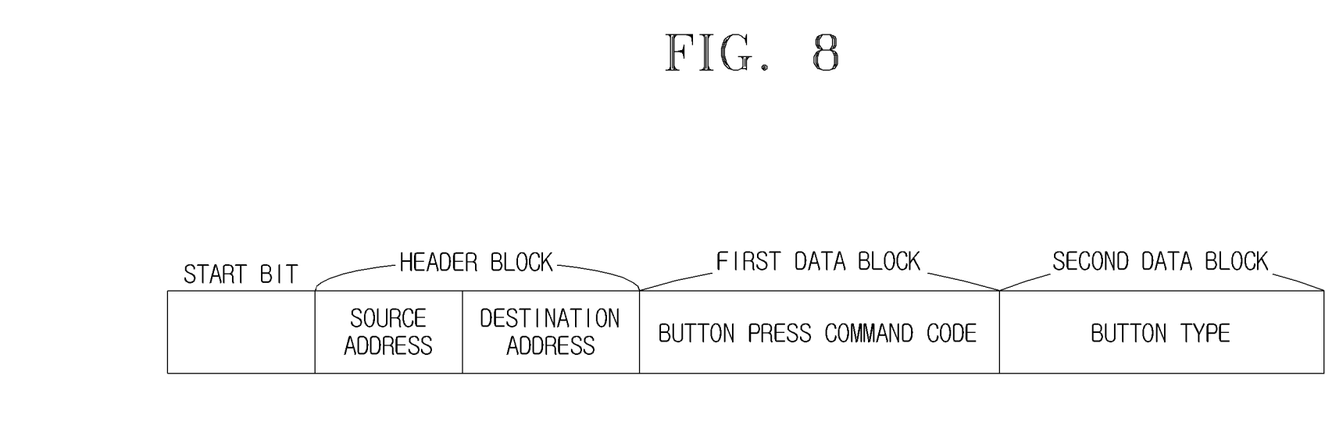
FIG. 8 is a diagram of a button press event message according to an exemplary embodiment of the present invention.

FIG. 8 shows the structure of the button press event message according to an exemplary embodiment of the present invention. The button press event message of FIG. 8 comprises a start bit, a header block, a first data block, and a second data block.

The header block comprises a source address and a destination address. Since the TV 100 sends the button press event message to the PC 200, the source address is the logical address value of the TV 100 and the destination address is the logical address value of the PC 200.

The first data block comprises a button press command code recorded as <OPCODE>. For example, the button press command code can be defined as <Mouse Button Pressed>.

The second data block comprises button type information. <Mouse Button Pressed> can use one of [Left button], [Right button], [Center button] as its parameter. That is, the type of the pressed button can be used as the parameter. For example, the button press event message <Mouse Button Pressed>(Left button) signifies that the user presses the left function button of the remote controller 150.

Figure 9:
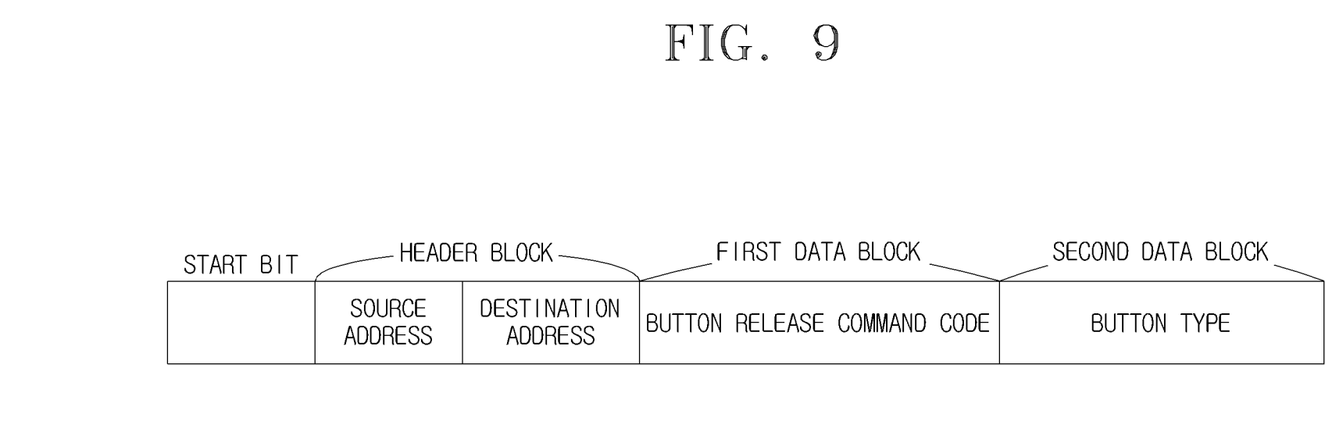
FIG. 9 is a diagram of a button release event message according to an exemplary embodiment of the present invention.

FIG. 9 shows the structure of the button release event message according to an exemplary embodiment of the present invention. The button release event message of FIG. 9 comprises a start bit, a header block, a first data block and a second data block.

The header block comprises a source address and a destination address. Since the TV 100 sends the button release event message to the PC 200, the source address is the logical address value of the TV and the destination address is the logical address value of the PC 200.

The first data block comprises a button release command code recorded as <OPCODE>. For example, the button release command code can be defined as <Mouse Button Released>.

The second data block comprises button type information. <Mouse Button Released> can use one of [Left button], [Right button], and [Center button] as its parameter. That is, the type of the released button can be used as the parameter. For example, the button release event message <Mouse Button Released>(Left button) signifies that the user releases the left function button of the remote controller 150.

The structure of the messages has been described in detail by referring to FIGS. 5 through 9.

In the exemplary embodiment of the present invention, the message is constructed as described in the HDMI CEC specification by way of example. Note that the message can be constructed according to other specification or as freely defined by the manufacturer.

Thus, the structure and the size of the message may vary from the message in the exemplary embodiment of the present invention.

While the video system comprises the TV 100 and the PC 200 in the exemplary embodiment of the present invention, the present invention applicable to a video system comprising other video apparatuses. The video apparatuses constituting the video system comprise TV, DVDR, set-top box (STB), DVD player (DVDP), digital video recorder (DVR), personal video recorder (PVR), hard disk drive (HDD) player, blue-ray disk (BD) player, BD recorder, video cassette recorder (VCR), home theatre system, personal multimedia player (PMP), digital camera, digital camcorder, and so on.

The video apparatuses constituting the video system are connected according to the HDMI CEC specification to ease the understanding of the present invention. Besides the HDMI CEC specification, the present invention is applicable to any scheme for transceiving the video signals and messages between the video apparatuses.

Other exemplary embodiments of the present invention are illustrated by referring to FIGS. 10 through 15.

Figure 10:
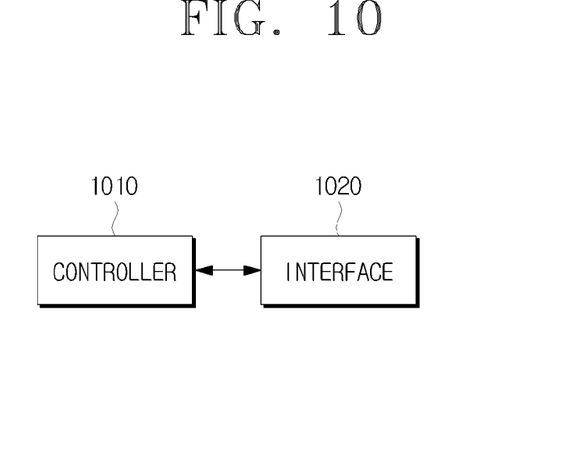
FIG. 10 is a block diagram of a video apparatus according to another exemplary embodiment of the present invention.

FIG. 10 is a block diagram of a video apparatus according to another exemplary embodiment of the present invention. A controller 1010 of FIG. 10 generates a coordinate information delivery message for transferring coordinate information input through an input device, to an external device connected according to the HDMI CEC specification. An interface 1020 transmits the coordinate information delivery message to the external device.

Figure 11:
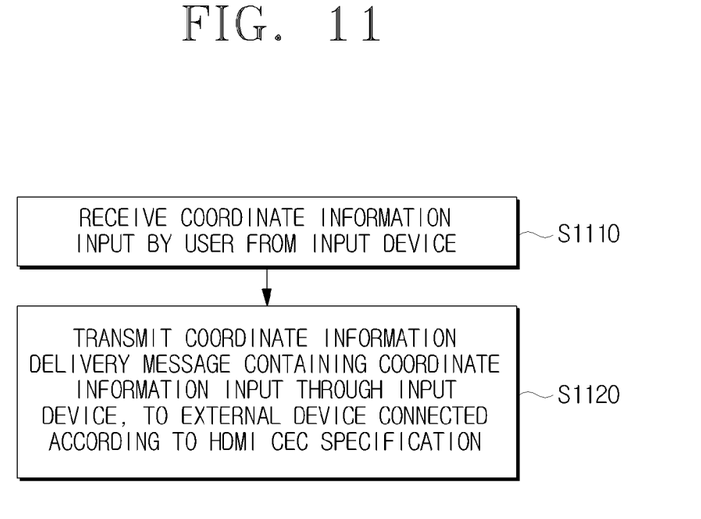
FIG. 11 is a flowchart of a coordinate information providing method according to another exemplary embodiment of the present invention.

FIG. 11 is a flowchart of a coordinate information providing method according to another exemplary embodiment of the present invention. In FIG. 11, the video apparatus receives the coordinate information input by the user from the input device (S1110). The video apparatus transmits a coordinate information delivery message containing the coordinate information input through the input device, to the external device connected according to the HDMI CEC specification (S1120).

Figure 12:
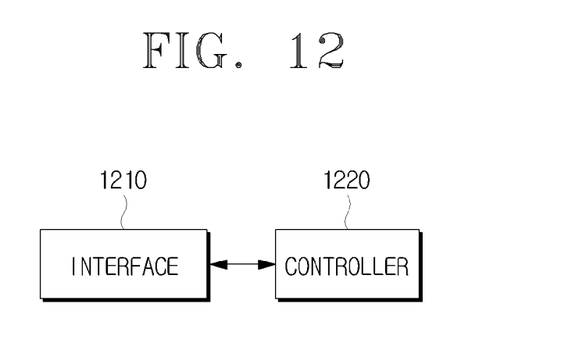
FIG. 12 is a block diagram of a video apparatus according to still another exemplary embodiment of the present invention.

FIG. 12 is a block diagram of a video apparatus according to still another exemplary embodiment of the present invention. An interface 1210 of FIG. 12 receives a coordinate information delivery message containing coordinate information input at the input device, from an external device connected according to the HDMI CEC specification. A controller 1220 controls to move the pointer to coordinates corresponding to the coordinate information of the received coordinate information delivery message.

Figure 13:
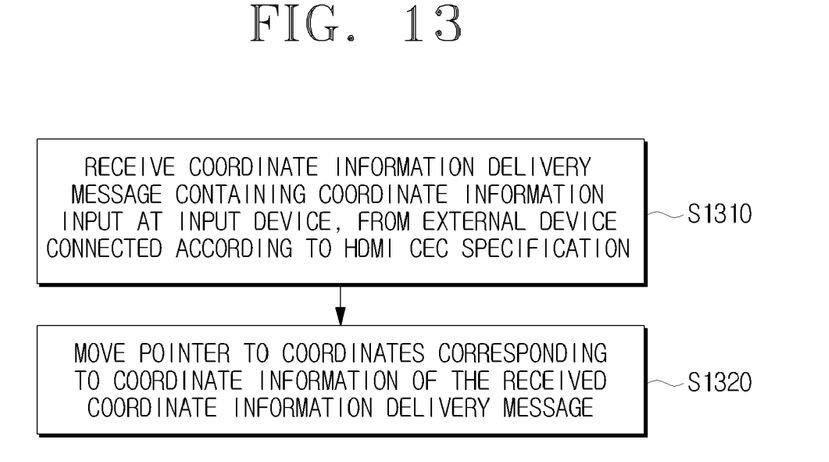
FIG. 13 is a flowchart of a coordinate information providing method according to still another exemplary embodiment of the present invention.

FIG. 13 is a flowchart of a coordinate information providing method according to still another exemplary embodiment of the present invention. In FIG. 13, the video apparatus receives the coordinate information delivery message containing the coordinate information input at the input device, from the external device connected according to the HDMI CEC specification (S1310). Next, the video apparatus controls to move the pointer to the coordinates corresponding to the coordinate information of the received coordinate information delivery message (S1320).

Figure 14:
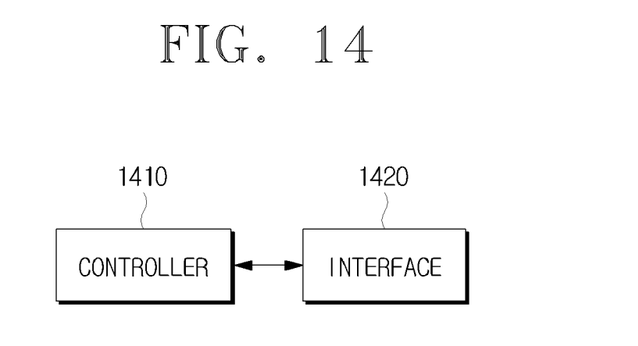
FIG. 14 is a block diagram of a video apparatus according to yet another exemplary embodiment of the present invention.

FIG. 14 is a block diagram of a video apparatus according to yet another exemplary embodiment of the present invention. When an event is generated at the input device by the user, a controller 1410 of FIG. 14 generates an event message informing of the event generation at the input device. An interface 1420 transmits the event message to an external device connected according to the HDMI CEC specification.

Figure 15:
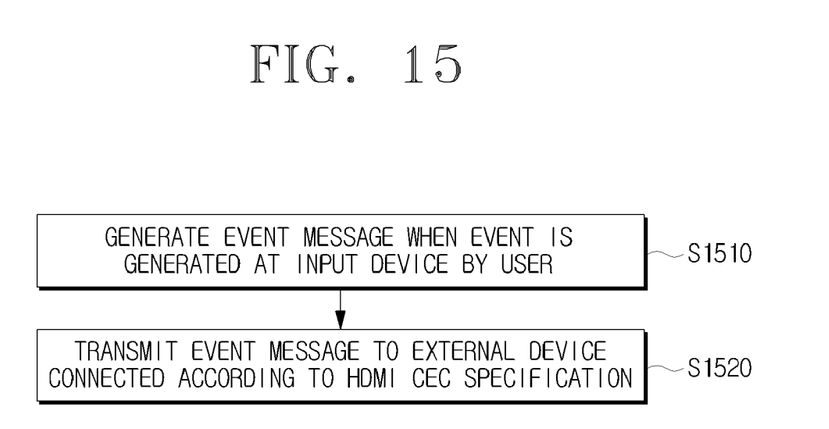
FIG. 15 is a flowchart of a coordinate information providing method according to yet another exemplary embodiment of the present invention.

FIG. 15 is a flowchart of a coordinate information providing method according to yet another exemplary embodiment of the present invention. In FIG. 15, when the event is generated at the input device by the user, the video apparatus generates the event message informing of the event generation at the input device (S1510). Next, the video apparatus transmits the event message to an external device connected according to the HDMI CEC specification (S1520).

Therefore, the video apparatus can provide the coordinate information to the connected external device.

As set forth above, the method for providing the coordinate information to the connected external device and the video apparatus thereof enable the user to more easily control the external device using the remote controller of the TV.

By providing the coordinate information to the external device connected to the TV using the remote controller of the TV, the user can utilize the TV remote controller like the mouse of the PC.

Further, the messages not defined in the HDMI CEC specification, that is, the coordinate information delivery message, the coordinate information available message, and the event message enable to control the external device by use of various input devices.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A coordinate information providing method comprising:
   receiving coordinate information of a pointer displayed in an external device connected according to a High Definition Multimedia Interface (HDMI) Consumer Electronics Control (CEC) specification from an input device; and
   transmitting a coordinate information delivery message containing the coordinate information from the input device, to the external device,
   wherein the coordinate information comprises a position change value with respect to a current position of the pointer or a position value with respect to a position of the pointer to be moved,
   wherein the coordinate information delivery message comprises a start bit, a header block, a first data block, and a second data block;
   wherein the first data block contains a command code indicative of a transferred command of the coordinate information, and the second data block contains parameter values of horizontal coordinate information and vertical coordinate information.

2. The coordinate information providing method of claim 1, further comprising:
   receiving a coordinate information available message which specifies whether the external device is able to use the coordinate information, from the external device.

3. The coordinate information providing method of claim 2, wherein the coordinate information available message comprises a coordinate information available command code and information relating to whether the coordinate information is available.

4. The coordinate information providing method of claim 1, further comprising:
   when an event is generated at the input device by the user, transmitting an event message informing of the event generation at the input device, to the external device.

5. The coordinate information providing method of claim 4, wherein the event comprises at least one of a button press event, a button release event, a wheel scroll-up event, and a wheel scroll-down event.

6. The coordinate information providing method of claim 5, wherein the button press event message comprises a button press command code and button type information.

7. The coordinate information providing method of claim 5, wherein the button release event message comprises a button release command code and button type information.

8. The coordinate information providing method of claim 1, wherein the coordinate information is input through the input device by a user.

9. The method according to claim 1, wherein the position change value comprises a numerical value for horizontal movement and a numerical value for vertical movement of the pointer with respect to a current pointer position.

10. The method according to claim 1, wherein the pointer is positioned on the external device according to a location on the input device touched by a user.

11. A video apparatus comprising:
- a controller which generates a coordinate information delivery message to transfer coordinate information of a pointer displayed in an external device input through an input device,
- wherein the external device is connected according to a High Definition Multimedia Interface (HDMI) Consumer Electronics Control (CEC) specification; and
- an interface which transmits the coordinate information delivery message to the external device,
- wherein the coordinate information comprises a position change value with respect to a current position of the pointer or a position value with respect to a position of the pointer to be moved,
- wherein the coordinate information delivery message comprises a start bit, a header block, a first data block, and a second data block;
- wherein the first data block contains a command code indicative of a transferred command of the coordinate information, and the second data block contains parameter values of horizontal coordinate information and vertical coordinate information.

12. The video apparatus of claim 11, wherein the interface receives a coordinate information available message which specifies whether the coordinate information is available, from the external device.

13. The video apparatus of claim 12, wherein the coordinate information available message comprises a coordinate information available command code and information relating to whether the coordinate information is available.

14. The video apparatus of claim 11, wherein, when an event is generated at the input device by the user, the controller generates an event message informing of the event generation at the input device, and
- the interface transmits the event message to the external device.

15. The video apparatus of claim 14, wherein the event comprises at least one of a button press event, a button release event, a wheel scroll-up event, and a wheel scroll-down event.

16. The video apparatus of claim 15, wherein the button press event message comprises a button press command code and button type information.

17. The video apparatus of claim 15, wherein the button release event message comprises a button release command code and button type information.

18. A coordinate information providing method comprising:
- receiving a coordinate information delivery message containing coordinate information of a pointer displayed in an external device connected according to a High Definition Multimedia Interface (HDMI) Consumer Electronics Control (CEC) specification input at an input device;
- moving a pointer to coordinates corresponding to the coordinate information contained in the received coordinate information delivery message;
- wherein the coordinate information delivery message comprises a start bit, a header block, a first data block, and a second data block;
- wherein the first data block contains a command code indicative of a transferred command of the coordinate information, and the second data block contains parameter values of horizontal coordinate information and vertical coordinate information.

19. A video apparatus comprising:
- an interface which receives a coordinate information delivery message containing coordinate information of a pointer displayed in an external device connected according to a High Definition Multimedia Interface (HDMI) Consumer Electronics Control (CEC) specification input at an input device, and
- a controller which controls to move a pointer to coordinates corresponding to the coordinate information contained in the received coordinate information delivery message,
- wherein the coordinate information delivery message comprises a start bit, a header block, a first data block, and a second data block;
- wherein the first data block contains a command code indicative of a transferred command of the coordinate information, and the second data block contains parameter values of horizontal coordinate information and vertical coordinate information.

* * * * *